US011463747B2

(12) United States Patent
Shen

(10) Patent No.: US 11,463,747 B2
(45) Date of Patent: Oct. 4, 2022

(54) SYSTEMS AND METHODS FOR REAL TIME CONTROL OF A REMOTE VIDEO PRODUCTION WITH MULTIPLE STREAMS

(71) Applicant: TVU Networks Corporation, Mountain View, CA (US)

(72) Inventor: Paul Shen, Woodside, CA (US)

(73) Assignee: TVU Networks Corporation, Mountain View, CA (US)

( * ) Notice: Subject to any disclaimer, the term of this patent is extended or adjusted under 35 U.S.C. 154(b) by 0 days.

(21) Appl. No.: 17/249,303

(22) Filed: Feb. 26, 2021

(65) Prior Publication Data

US 2021/0235137 A1 Jul. 29, 2021

Related U.S. Application Data

(63) Continuation-in-part of application No. 16/369,957, filed on Mar. 29, 2019, now Pat. No. 10,966,001.

(Continued)

(51) Int. Cl.
*H04N 5/445* (2011.01)
*H04N 21/2343* (2011.01)
(Continued)

(52) U.S. Cl.
CPC ... *H04N 21/23439* (2013.01); *H04N 21/2187* (2013.01); *H04N 21/2387* (2013.01); *H04N 21/23418* (2013.01); *H04N 21/2662* (2013.01)

(58) Field of Classification Search
CPC ......... H04N 21/23439; H04N 21/2187; H04N 21/23418; H04N 21/2387; H04N 21/2662;
(Continued)

(56) References Cited

U.S. PATENT DOCUMENTS 5,510,848 A 4/1996 Nocture et al.
5,991,799 A 11/1999 Yen et al.
(Continued)

FOREIGN PATENT DOCUMENTS

CN 105100829 11/2015
CN 105684414 6/2016
(Continued)

*Primary Examiner* — Michael B. Pierorazio
(74) *Attorney, Agent, or Firm* — Lipsitz & McAllister, LLC

(57) ABSTRACT

The present invention relates to a cloud-based video production system and corresponding methods that deliver real time or near real time video with broadcast quality. Video from the same source is encoded into at least two separate streams, one with low latency and another with higher latency and higher quality. Corresponding frames of each stream have identical timestamps. The two streams are sent over separate signal paths. A first signal path is a real time control (RTC) path having low latency, and used to communicate the lower quality video content from video sources to a producer user interface. The second signal path provides the same video content at a higher video quality than that provided over the first signal path, but with longer latency. Commands from the user interface based on the lower latency stream can then be carried out on the higher latency stream.

18 Claims, 2 Drawing Sheets

Related U.S. Application Data

(60) Provisional application No. 63/018,717, filed on May 1, 2020, provisional application No. 62/652,978, filed on Apr. 5, 2018.

(51) Int. Cl.
*H04N 21/234* (2011.01)
*H04N 21/2187* (2011.01)
*H04N 21/2662* (2011.01)
*H04N 21/2387* (2011.01)

(58) Field of Classification Search
CPC ......... H04N 21/23424; H04N 21/2393; H04N 21/2408; H04N 21/2665; H04N 21/6587; H04N 21/8547; H04N 21/21805; H04N 21/242; H04N 21/631; H04N 5/268; H04N 5/222
See application file for complete search history.

(56) References Cited

U.S. PATENT DOCUMENTS

| | | |
|---|---|---|
| 6,208,691 B1 | 3/2001 | Balakrishnan et al. |
| 7,299,275 B2 | 11/2007 | Tsukidate et al. |
| 7,369,749 B2 | 5/2008 | Ichioka et al. |
| 7,603,683 B2 | 10/2009 | Reto |
| 7,653,921 B2 | 1/2010 | Herley |
| 7,712,125 B2 | 5/2010 | Herigstad et al. |
| 7,734,579 B2 | 6/2010 | White et al. |
| 7,817,186 B2 | 10/2010 | Tamamura |
| RE41,968 E | 11/2010 | Washino et al. |
| 7,908,625 B2 | 3/2011 | Robertson et al. |
| 7,958,532 B2* | 6/2011 | Paul ............... H04N 21/234327 725/135 |
| 8,064,389 B2* | 11/2011 | Khan ............... H04B 7/2123 375/240 |
| 8,072,943 B2* | 12/2011 | Khan ............... H04B 7/022 370/335 |
| 8,151,301 B2* | 4/2012 | Bennett ............... H04N 7/165 725/59 |
| 8,184,168 B2 | 5/2012 | Kindborg et al. |
| 8,307,395 B2 | 11/2012 | Issa et al. |
| 8,490,133 B1 | 7/2013 | Parekh et al. |
| 8,516,345 B2 | 8/2013 | Quere et al. |
| 8,621,508 B2 | 12/2013 | Rowe et al. |
| 8,631,452 B2 | 1/2014 | Xu et al. |
| 8,713,195 B2 | 4/2014 | Pickens et al. |
| 8,806,563 B2 | 8/2014 | Coufal et al. |
| 8,839,295 B2 | 9/2014 | Kim |
| 8,881,220 B2 | 11/2014 | Arya et al. |
| 9,226,022 B2 | 12/2015 | Ferguson |
| 10,021,433 B1 | 7/2018 | Hundemer et al. |
| 10,270,959 B1 | 4/2019 | Bart et al. |
| 2002/0054244 A1 | 5/2002 | Holtz et al. |
| 2002/0057348 A1 | 5/2002 | Miura et al. |
| 2003/0061206 A1 | 3/2003 | Qian |
| 2003/0063213 A1 | 4/2003 | Poplin |
| 2003/0063217 A1 | 4/2003 | Smith |
| 2004/0103426 A1 | 5/2004 | Ludvig et al. |
| 2004/0148571 A1 | 7/2004 | Lue |
| 2004/0215718 A1 | 10/2004 | Kazmi et al. |
| 2005/0144455 A1 | 6/2005 | Haitsma |
| 2005/0262542 A1 | 11/2005 | DeWeese et al. |
| 2006/0031883 A1 | 2/2006 | Ellis et al. |
| 2006/0031889 A1 | 2/2006 | Bennett et al. |
| 2006/0055785 A1 | 3/2006 | Nagajima |
| 2006/0190966 A1 | 8/2006 | McKissick et al. |
| 2007/0124756 A1 | 5/2007 | Covell et al. |
| 2007/0157281 A1 | 7/2007 | Ellis et al. |
| 2007/0204285 A1 | 8/2007 | Louw |
| 2008/0027953 A1 | 1/2008 | Morita et al. |
| 2008/0059532 A1 | 3/2008 | Kazmi et al. |
| 2008/0060036 A1 | 3/2008 | Cox |
| 2008/0077568 A1 | 3/2008 | Ott |
| 2008/0170630 A1 | 7/2008 | Falik et al. |
| 2008/0215170 A1 | 9/2008 | Milbrandt et al. |
| 2008/0235733 A1 | 9/2008 | Heie et al. |
| 2009/0037954 A1 | 2/2009 | Nagano |
| 2009/0119708 A1 | 5/2009 | Harrar et al. |
| 2009/0179982 A1 | 7/2009 | Yanagisawa et al. |
| 2009/0183201 A1 | 7/2009 | Dasgupta |
| 2009/0237548 A1 | 9/2009 | Watanabe et al. |
| 2009/0268806 A1* | 10/2009 | Kim ............... H04N 21/4334 375/316 |
| 2009/0320058 A1 | 12/2009 | Wehmeyer et al. |
| 2009/0320060 A1 | 12/2009 | Barrett |
| 2009/0320072 A1 | 12/2009 | McClanahan et al. |
| 2009/0320073 A1 | 12/2009 | Reisman |
| 2009/0328085 A1 | 12/2009 | Beyabani et al. |
| 2010/0050203 A1 | 2/2010 | Yamagishi |
| 2010/0121936 A1 | 5/2010 | Liu et al. |
| 2010/0131385 A1 | 5/2010 | Harrang et al. |
| 2010/0157020 A1 | 6/2010 | Choi et al. |
| 2010/0251292 A1 | 9/2010 | Srinivasan et al. |
| 2010/0260254 A1* | 10/2010 | Kimmich ............ H04N 19/164 375/240 |
| 2010/0260268 A1* | 10/2010 | Cowan ............... H04N 19/635 348/E13.001 |
| 2010/0296487 A1 | 11/2010 | Karaoguz et al. |
| 2010/0333148 A1 | 12/2010 | Musha et al. |
| 2011/0002397 A1* | 1/2011 | Wang ............... H04N 19/30 375/240.26 |
| 2011/0066744 A1 | 3/2011 | Del Sordo et al. |
| 2011/0068899 A1 | 3/2011 | Ioffe et al. |
| 2011/0086619 A1 | 4/2011 | George et al. |
| 2011/0096828 A1* | 4/2011 | Chen ............... H04N 21/8456 375/E7.126 |
| 2011/0138064 A1 | 6/2011 | Rieger et al. |
| 2011/0164683 A1* | 7/2011 | Takahashi ............ H04N 19/31 375/E7.123 |
| 2011/0179462 A1 | 7/2011 | Kubo et al. |
| 2011/0187503 A1* | 8/2011 | Costa ............... H05K 7/1498 340/8.1 |
| 2011/0191439 A1 | 8/2011 | Dazzi et al. |
| 2011/0191446 A1 | 8/2011 | Dazzi et al. |
| 2011/0239078 A1* | 9/2011 | Luby ............... H04N 21/8456 714/752 |
| 2012/0110614 A1 | 5/2012 | Whitley |
| 2012/0117590 A1 | 5/2012 | Agnihotri et al. |
| 2012/0144435 A1 | 6/2012 | Spilo et al. |
| 2012/0185907 A1* | 7/2012 | Park ............... H04N 21/242 725/110 |
| 2012/0250619 A1* | 10/2012 | Twitchell, Jr. ......... H04W 40/12 370/328 |
| 2012/0278725 A1 | 11/2012 | Gordon et al. |
| 2012/0291079 A1 | 11/2012 | Gordon et al. |
| 2012/0307052 A1 | 12/2012 | Thiruvengada et al. |
| 2012/0307082 A1 | 12/2012 | Thiruvengada et al. |
| 2012/0320168 A1* | 12/2012 | Yun ............... H04N 21/4347 348/51 |
| 2013/0128074 A1 | 5/2013 | Mitsugi |
| 2013/0136193 A1* | 5/2013 | Hwang ............... H03M 13/05 714/776 |
| 2013/0155182 A1 | 6/2013 | Bekiares et al. |
| 2013/0268962 A1 | 10/2013 | Snider et al. |
| 2013/0268973 A1 | 10/2013 | Archibong et al. |
| 2013/0305304 A1* | 11/2013 | Hwang ............... H04N 21/6405 725/109 |
| 2014/0067828 A1 | 3/2014 | Archibong et al. |
| 2014/0092254 A1 | 4/2014 | Mughal et al. |
| 2014/0098289 A1* | 4/2014 | Jang ............... H04N 21/440263 348/441 |
| 2014/0119712 A1* | 5/2014 | Jang ............... G11B 20/1217 386/248 |
| 2014/0125703 A1 | 5/2014 | Roveta et al. |
| 2014/0211861 A1* | 7/2014 | Lee ............... H04N 19/89 375/240.27 |
| 2014/0250484 A1 | 9/2014 | Duennebier et al. |
| 2014/0280564 A1 | 9/2014 | Darling et al. |
| 2015/0019670 A1* | 1/2015 | Redmann ............ H04L 65/4092 709/207 |
| 2015/0022674 A1 | 1/2015 | Blair et al. |

(56) References Cited

U.S. PATENT DOCUMENTS

| | | | |
|---|---|---|---|
| 2015/0039608 A1 | 2/2015 | Basilico |
| 2015/0082203 A1 | 3/2015 | James et al. |
| 2015/0100586 A1 | 4/2015 | Caruso |
| 2015/0113576 A1 | 4/2015 | Carroll |
| 2015/0128179 A1 | 5/2015 | Cormican et al. |
| 2015/0286716 A1 | 10/2015 | Snibbe et al. |
| 2015/0304689 A1 | 10/2015 | Warren |
| 2015/0378000 A1 | 12/2015 | Bar David et al. |
| 2016/0057477 A1 | 2/2016 | Finkelstein |
| 2016/0112741 A1 | 4/2016 | Elm et al. |
| 2016/0182785 A1 | 6/2016 | Ogata et al. |
| 2016/0366228 A1 | 12/2016 | Overton |
| 2016/0381276 A1 | 12/2016 | Li et al. |
| 2017/0070659 A1 | 3/2017 | Kievsky et al. |
| 2017/0127150 A1 | 5/2017 | Kuo et al. |
| 2017/0295309 A1 | 10/2017 | Cabral et al. |
| 2017/0303005 A1 | 10/2017 | Shen et al. |
| 2017/0337912 A1 | 11/2017 | Caligor et al. |
| 2018/0088444 A1 | 3/2018 | Matsumoto et al. |
| 2020/0013432 A1 | 1/2020 | Doi et al. |

FOREIGN PATENT DOCUMENTS

| | | |
|---|---|---|
| EP | 3550848 | 10/2019 |
| WO | 2015148634 | 10/2015 |
| WO | 2016202889 | 12/2016 |
| WO | 2018138300 | 8/2018 |

\* cited by examiner

SYSTEMS AND METHODS FOR REAL TIME CONTROL OF A REMOTE VIDEO PRODUCTION WITH MULTIPLE STREAMS

This application claims the benefit of U.S. Provisional Application No. 63/018,717 filed on May 1, 2020, and is a continuation-in-part of commonly owned co-pending U.S. application Ser. No. 16/369,957 filed on Mar. 29, 2019, which claims the benefit of U.S. Provisional Application No. 62/652,978 filed on Apr. 5, 2018, each of which is incorporated herein and made a part hereof by reference for all purposes.

BACKGROUND OF THE INVENTION

The present invention relates to the field of video production. More specifically, the present invention relates to a cloud-based video production system that enables real time or near real time manipulation of video from multiple sources.

In particular, the present invention relates to meeting the demand in the video production process requiring low latency video for interaction, preview and control, while the video quality for the signal delivered to the consumer needs to be very high. It should be appreciated that the same technology disclosed herein for use with cloud-based video production can also be used for normal video production.

To transmit a broadcast quality video signal, the latency is quite often longer than what real time interaction demands in certain situations, such as a news anchor or television host having a video conference with one or more remote guests, in real time. However, real time video conferencing systems have difficulty delivering broadcast quality video.

It would be advantageous to provide methods and apparatus that enable real time or near real time interaction with video content while still enabling broadcast quality video production. It would also be advantageous to provide such features as part of a cloud-based video production system to produce live video content.

The methods and apparatus of the present invention provide the foregoing and other advantages.

SUMMARY OF THE INVENTION

The present invention relates to a cloud-based video production system that enables real time or near real time manipulation of video from multiple sources.

In accordance with an example embodiment of a method for real time video production using multiple streams, video content from each of one or more video sources is encoded into at least two separate streams, a first video stream from each of the one or more video sources comprising a low quality version of the video content having a low latency and a second video stream from each of the one or more video sources comprising a higher quality version of the video content having a higher latency. Corresponding video frames of the first video stream and the second video stream are provided with identical video timestamps. A first signal path is provided for communicating the first video stream from the one or more video sources to a user interface at the low latency. A second signal path is provided for communicating the second video stream from the one or more video sources to the user interface at the higher latency. Control signals comprising commands are sent (e.g., from the user interface to a control unit) for selecting and manipulating the video content from the one or more video sources. The commands may be based on one or more of the first video streams received on the first signal path. The commands are carried out on video content from one or more of the second video streams received on the second signal path to produce a video program.

The second video streams may be buffered at one or more buffers to account for latencies in carrying out the commands. The buffering may enable rewind and instant replay features. A user device comprising the user interface may be adapted to receive the first video streams over the first signal path. A cloud production server may be adapted to receive the second video streams over the second signal path. The commands may be communicated from the user device to a control unit of the cloud production server.

The user device may comprise a display for displaying the first video streams from the one or more video sources.

The control signal may further comprise the video timestamp for each of the video frames subject to the command. The commands are executed at the time when the video timestamp at an output of the buffer matches the video timestamp received in the control signal.

The second video streams may comprise production quality video. Further, the video content may comprise live video content.

The commands may comprise commands for: switching between the video content provided by the one or more video sources; selecting the video content or portions of the video content provided by one or more of the one or more video sources; combining the video content or portions of the video content from the one or more video sources; manipulating the video content or the portions of the video content; adjusting video brightness; providing a graphics overlay; turning on and off a video graphics overlay; adjusting an audio level; and adding special effects to the video content or portions of the video content.

The present invention also includes apparatus and systems for carrying out the method. An example embodiment of a system for real time video production using multiple streams may comprise one or more video sources each providing respective video content, each of the one or more video sources encoding the respective video content into at least two separate streams, a first video stream from each of the one or more video sources comprising a low quality version of the video content having a low latency and a second video stream from each of the one or more video sources comprising a higher quality version of the video content having a higher latency. The system may also comprise a first signal path for communicating the first video stream from the one or more video sources to a user interface at the low latency and a second signal path for communicating the second video stream from the one or more video sources to the user interface at the higher latency. A user interface may be provided for sending control signals comprising commands for selecting and manipulating the video content from the one or more video sources, the commands being based on one or more of the first video streams received on the first signal path. The system may also comprise a video production server for carrying out the commands on one or more of the second video streams to produce a video program. Corresponding video frames of the first video stream and the second video stream may be provided with identical video timestamps.

The systems and apparatus of the present invention may also include various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to a cloud-based video production system that delivers real time or near real time video with broadcast quality. Video from the same source is encoded into at least two separate streams, one with low latency and another with higher latency and higher quality. Corresponding frames of each stream have identical timestamps. Encoding the same video content into two streams with identical timestamps but different latencies and quality enables advantageous methods of video production and control, as will be explained in detail below in connection with exemplary embodiments.

Figure 1:
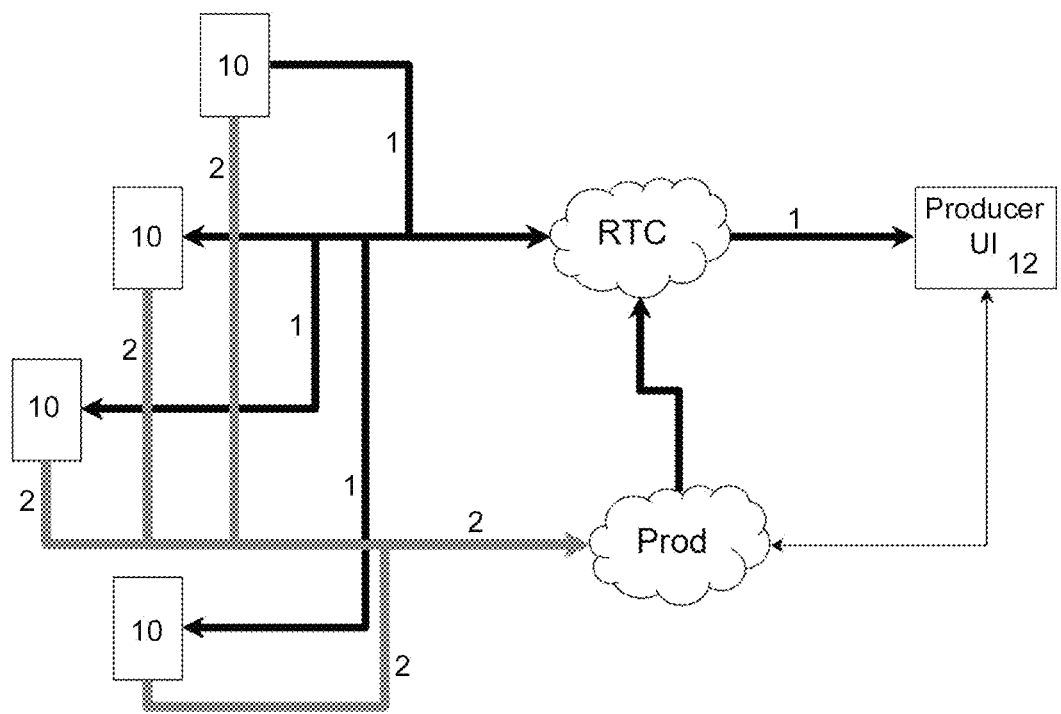
FIG. 1 shows an example embodiment of flow paths in a video production system in accordance with the present invention.

FIG. 1 shows an example embodiment of flow paths in a video production system in accordance with the present invention. Multiple video sources 10 will each encode and output two versions of the same video content, a high-quality version and a lower quality version. The two versions of the video content will be provided in separate video streams transmitted along two different signal paths 1 and 2.

The video signals may comprise any combination of one or more of video, audio, and data. The video sources 10 may comprise one or more of a video camera, a camcorder, a television camera, a movie camera, a portable electronic device, an IP or web camera, a tablet computer, a laptop or computer monitor with built-in web camera, a smart phone, or the like. The first signal path 1 is a real time control (RTC) path having low latency. The first signal path 1 is used to communicate the lower quality video content from video sources 10 to a producer user interface (UI) 12. The second signal path 2 provides the same video content at a higher video quality than that provided over the first signal path 1, but with longer latency. The video provided over the second signal path 2 may be, for example, production quality video.

The video streams sent along the first signal path 1 may be seen as proxy signals. All interactions between the video sources 10 and the producer UI 12 take place over the first signal path 1. For example, commands initiated from the producer UI 12 over the first signal path 1 may comprise commands for switching between the video sources 10, selecting the video content (or portions of the video content) from one or more of the video sources 10, combining the video content (or portions of the video content) from one or more of the video sources 10, manipulating the video content or portions of the video content, adjusting video brightness, providing a graphics overlay, turning on and off a graphics overlay, adjusting an audio level, adding special effects (either via embedding or overlay) to the video content or portions of the video content, and the like.

The video streams sent along the second signal path 2 are used to create high quality video output based upon the commands from the producer UI 12.

Figure 2:
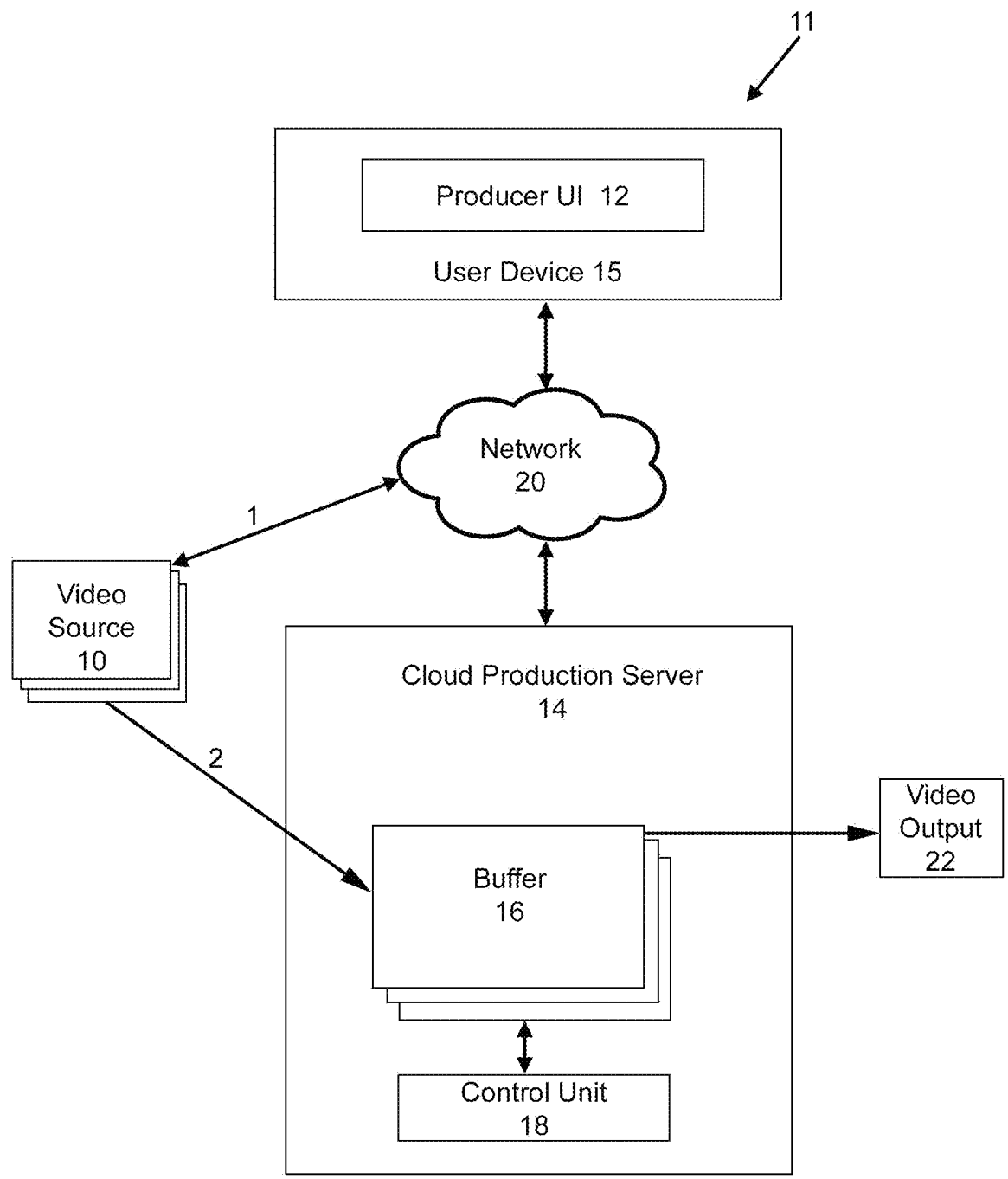
FIG. 2 shows an example embodiment of a cloud-based video production system in accordance with the present invention.

FIG. 2 shows an example embodiment of a cloud-based video production system 11 in accordance with the present invention. The video streams sent from video sources 10 along both video signal paths 1 and 2 are routed through a cloud production server 14 and/or network 20, as are instructions from the producer UI 12. The cloud production server 14 may comprise one or more buffers 16.

A user may be operating the system remotely through a network 20 via the producer UI 12. The producer UI 12 receives the video streams over the first signal path. The producer UI 12 may be an application or a web browser running on an Internet enabled user device 15 (e.g., a computer, a laptop, a portable computer, a tablet computer, a smart phone, a smart watch, or any other type of personal computing device or other internet or network enabled device). The producer UI 12 may include a display for displaying the video content from the one or more video sources 10 (e.g., via the network 20) received via the first signal path 1. The producer UI 12 enables a user to select and control which content to use in the video program via control signals containing commands sent to the cloud production server 14. Selection of the video content, and execution of commands from the producer UI 12, is carried out via a control unit 18 located at or in communication with the cloud production server 14.

In order to apply the commands to the program output of the buffer 16 at exactly the same time location as instructed by the producer UI 12, both video streams sent along signal paths 1 and 2 use the same corresponding timestamps for the same time moment of the corresponding video stream, which may include video, audio and/or data.

The one or more buffers 16 are provided to account for anticipated delay between the cloud production server 14 and producer UI 12. The high quality video streams sent from video sources 10 to the cloud production server 14 along the second signal path 2 are buffered in the one or more buffers 16. When a user initiates an action on the producer UI 12 based on the low latency video streams received along the first signal path 1, the producer UI 12 creates a corresponding command and also records the timestamps of the video showing on the producer UI 12 at that moment. The producer UI 12 sends a control signal with the command(s) together with the timestamp(s) of the corresponding video frames subject to the commands to the production server 14 for execution on the program content.

Once the control unit 18 receives a command together with the timestamp from the producer UI 12, it will execute the command on the video streams sent along the second signal path 2 at the buffer 16, according to the timestamps in the video signal. The cloud production server 14 then produces a high-quality video output 22 based on the video streams from the second signal path 2.

For example, during a video conference among multiple participants each participant may participate using a separate video source 10 (e.g., a web cam). Each video source 10 for each participant may simultaneously send video streams over the first and second signal paths 1 and 2, with a lower quality streams being sent with low latency over the first signal path 1 and a high quality video stream with higher latency being sent over the second signal path. The video streams are received by the cloud production server 14 and the producer UI 12, with the video streams sent over the first signal path 1 being made available to a user on the producer UI 12 and the video streams sent over the second signal path 2 being buffered at the one or more buffers 16. During the video conference, the video output 22 may show a first participant in the video conference.

If the user decides to switch from viewing or speaking to the first participant in the video conference, an instruction may be sent to switch to a different video source 10 for a second participant. The command and a time stamp of the video stream at the time the command was sent will be provided from the producer UI 12 to the control unit 18. The control unit 18 will execute the command at a time when the video timestamp at the buffer 16 matches the timestamp received from the producer UI 12. After execution of the command, the buffer 16 will output video from a video source 10 of the second participant that is received along the second signal path 2, resulting in a high-quality video output 22.

Since the video content received from the video sources 10 along the second signal path 2 is delayed by the one or more buffers 16, any network delay in carrying out the command from the producer UI 12 is accounted for. However, such delay is reduced since the commands are based on the low latency video signals received along the first signal path 1. Using the time stamps from the video content received over the first signal path 1 and corresponding timestamps from the commands, the desired actions specified in the commands can be synchronized to affect the desired video content output from the second signal path 2 at the appropriate time.

The output video 22 may be output for live broadcast or distribution to other media platforms, such as one or more social media outlets, a digital media distribution platform, or the like. The completed video program 22 may also be downloaded to the user device 15 and distributed to media outlets or further modified or edited prior to such distribution.

The system is particularly advantageous for the production of live video conferences among multiple participants. However, the system may also be used to create various other types of video programs, including news programs, sports, weather, live events, entertainment, and more. The video sources 10 may provide live video content for the production of live video programs. The video content can also be stored for later use. For example, the system may be used to produce a live sporting event, where each video source comprises a different camera or camera angle of the sporting event. Instant replays can be generated by sending commands to the control unit 18 requesting the addition of content from one or more of the video sources which includes the play to be shown in the instant replay.

The one or more buffers 16 may be large enough to record all input feeds from the corresponding video source 10 for the entire event, facilitating instant replay and rewind features. The buffers 16 may also be used for storing the raw video content for future production needs, such as reproducing the video program. The buffers 16 may be implemented with short term memory (RAM), local storage (hard disk on the cloud production server 14 or otherwise associated with the video source 10), and long term storage (cloud storage, such as AWS S3 or the like). Access to long term storage of the buffers 16 may be seamless, similar to access to short term or local storage.

It should now be appreciated that the present invention provides advantageous methods and apparatus for providing a high-quality video output from a cloud-based video production system.

Although the invention has been described in connection with various illustrated embodiments, numerous modifications and adaptations may be made thereto without departing from the spirit and scope of the invention as set forth in the claims.

What is claimed is:

1. A method for real time video production using multiple streams, comprising:

encoding video content from each of one or more video sources into at least two separate streams, a first video stream from each of the one or more video sources comprising a low quality version of the video content having a low latency and a second video stream from each of the one or more video sources comprising a higher quality version of the video content having a higher latency;

providing corresponding video frames of the first video stream and the second video stream with identical video timestamps;

providing a first signal path for communicating the first video stream from the one or more video sources to a user interface at the low latency;

providing a second signal path for communicating the second video stream from the one or more video sources to the user interface at the higher latency;

sending control signals comprising commands for selecting and manipulating the video content from the one or more video sources, the commands being based on one or more of the first video streams received on the first signal path; and carrying out the commands on video content from one or more of the second video streams received on the second signal path to produce a video program;

wherein:

a user device comprising the user interface is adapted to receive the first video streams over the first signal path;

a cloud production server is adapted to receive the second video streams over the second signal path; and the commands are communicated from the user device to a control unit of the cloud production server.

2. A method in accordance with claim 1, further comprising buffering the second video streams at one or more buffers to account for latencies in carrying out the commands.

3. A method in accordance with claim 2, wherein the buffering enables rewind and instant replay features.

4. A method in accordance with claim 1, wherein the user device comprises a display for displaying the first video streams from the one or more video sources.

5. A method in accordance with claim 2, wherein:

the control signal further comprises the video timestamp for each of the video frames subject to the command; and the commands are executed at the time when the video timestamp at an output of the buffer matches the video timestamp received in the control signal.

6. A method in accordance with claim 5, wherein the video timestamp received in the control signal comprises the video timestamp of the video frame displayed at the time the control signal is generated.

7. A method in accordance with claim 1, wherein the second video streams comprise production quality video.

8. A method in accordance with claim 1, wherein the video content comprises live video content.

9. A method for real time video production using multiple streams, comprising:

encoding video content from each of one or more video sources into at least two separate streams, a first video stream from each of the one or more video sources comprising a low quality version of the video content having a low latency and a second video stream from each of the one or more video sources comprising a higher quality version of the video content having a higher latency;

providing corresponding video frames of the first video stream and the second video stream with identical video timestamps;

providing a first signal path for communicating the first video stream from the one or more video sources to a user interface at the low latency;

providing a second signal path for communicating the second video stream from the one or more video sources to the user interface at the higher latency;

sending control signals comprising commands for selecting and manipulating the video content from the one or more video sources, the commands being based on one or more of the first video streams received on the first signal path; and carrying out the commands on video content from one or more of the second video streams received on the second signal path to produce a video program;

wherein the commands comprise commands for: switching between the video content provided by the one or more video sources; selecting the video content or portions of the video content provided by one or more of the one or more video sources; combining the video content or portions of the video content from the one or more video sources; manipulating the video content or the portions of the video content; adjusting video brightness; providing a graphics overlay; turning on and off a video graphics overlay; adjusting an audio level; and adding special effects to the video content or portions of the video content.

10. A system for real time video production using multiple streams, comprising:

one or more video sources each providing respective video content, each of the one or more video sources encoding the respective video content into at least two separate streams, a first video stream from each of the one or more video sources comprising a low quality version of the video content having a low latency and a second video stream from each of the one or more video sources comprising a higher quality version of the video content having a higher latency;

a first signal path for communicating the first video stream from the one or more video sources to a user interface at the low latency;

a second signal path for communicating the second video stream from the one or more video sources to the user interface at the higher latency;

a user interface for sending control signals comprising commands for selecting and manipulating the video content from the one or more video sources, the commands being based on one or more of the first video streams received on the first signal path; and a cloud production server for carrying out the commands on video content from one or more of the second video streams received on the second signal path to produce a video program;

wherein:

corresponding video frames of the first video stream and the second video stream are provided with identical video timestamps;

a user device comprises the user interface which is adapted to receive the first video streams over the first signal path;

the cloud production server is adapted to receive the second video streams over the second signal path; and the commands are communicated from the user device to a control unit of the cloud production server.

11. A system in accordance with claim 10, further comprising one or more buffers for buffering the second video streams to account for latencies in carrying out the commands.

12. A system in accordance with claim 11, wherein the buffering enables rewind and instant replay features.

13. A system in accordance with claim 10, wherein the user device comprises a display for displaying the first video streams from the one or more video sources.

14. A system in accordance with claim 11, wherein:

the control signal further comprises the video timestamp for each of the video frames subject to the command; and the commands are executed at the time when the video timestamp at an output of the buffer matches the video timestamp received in the control signal.

15. A system in accordance with claim 14, wherein the video timestamp received in the control signal comprises the video timestamp of the video frame displayed at the time the control signal is generated.

16. A system in accordance with claim 10, wherein the second video streams comprise production quality video.

17. A system in accordance with claim 10, wherein the video content comprises live video content.

18. A system for real time video production using multiple streams, comprising:

one or more video sources each providing respective video content, each of the one or more video sources encoding the respective video content into at least two separate streams, a first video stream from each of the one or more video sources comprising a low quality version of the video content having a low latency and a second video stream from each of the one or more video sources comprising a higher quality version of the video content having a higher latency;

a first signal path for communicating the first video stream from the one or more video sources to a user interface at the low latency;

a second signal path for communicating the second video stream from the one or more video sources to the user interface at the higher latency;

a user interface for sending control signals comprising commands for selecting and manipulating the video content from the one or more video sources, the commands being based on one or more of the first video streams received on the first signal path; and a cloud production server for carrying out the commands on video content from one or more of the second video streams received on the second signal path to produce a video program;

wherein:

corresponding video frames of the first video stream and the second video stream are provided with identical video timestamps; and the commands comprise commands for: switching between the video content provided by the one or more video sources; selecting the video content or portions of the video content provided by one or more of the one or more video sources; combining the video content or portions of the video content from the one or more video sources; manipulating the video content or the portions of the video content; adjusting video brightness; providing a graphics overlay; turning on and off a video graphics overlay; adjusting an audio level; and adding special effects to the video content or portions of the video content.

\* \* \* \* \*